March 28, 1944. W. A. DERR 2,345,039
CONTROL AND SIGNAL SYSTEM
Filed Oct. 18, 1941
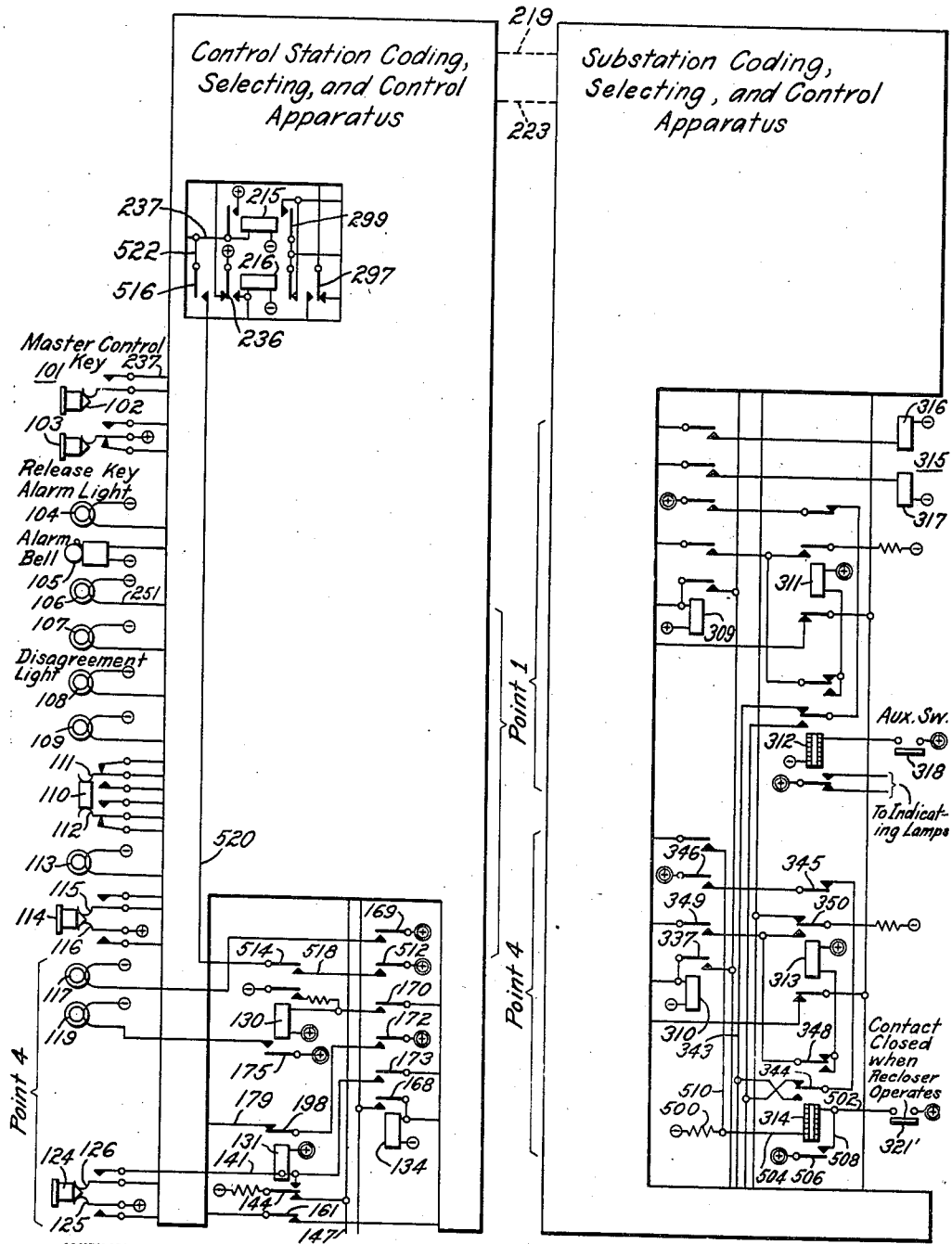
WITNESSES:
Wm. B. Sellers.
Joe Weber.
INVENTOR
Willard A. Derr.
BY
G. M. Crawford
ATTORNEY Patented Mar. 28, 1944

2,345,039

UNITED STATES PATENT OFFICE 2,345,039

CONTROL AND SIGNAL SYSTEM

Willard A. Derr, Wilkinsburg, Pa., assignor to Westinghouse Electric & Manufacturing Company, East Pittsburgh, Pa., a corporation of Pennsylvania Application October 18, 1941, Serial No. 415,604

4 Claims. (Cl. 177—353)

My invention relates, generally, to supervisory control systems, and, more particularly, to supervisory control systems in which both the operations of remote apparatus and their position may be indicated at a control station.

In the operation of power systems certain circuit breakers or other apparatus units, are often selectively controlled by a supervisory control system and, in addition, are automatically controlled by automatic reclosing means. Such automatic reclosing means usually functions to automatically reclose a circuit breaker when it trips for any reason, such as a fault on the power line controlled by the breaker, and to lock-out the breaker to prevent its reclosing in the event that it continues to trip after a predetermined number of reclosures. Such an automatic reclosing circuit breaker control system is disclosed in the patent to F. D. Gamel, No. 2,125,157, issued July 26, 1938.

Heretofore, supervisory control systems have functioned to indicate the position of each of several breakers and, in addition, to give a single alarm indication when any of the several breakers has tripped. Such a supervisory control system is described in the patent to H. P. Boswau, No. 2,208,535, issued July 16, 1940. If a breaker of such a system should be tripped and reclosed before the operator at the control station could observe which breaker had tripped, the operator would only know that one of the breakers had tripped and reclosed but would not know which breaker had operated.

It is an object of my invention therefore, to provide a supervisory control system which shall function to give an indication of the position of a plurality of remotely disposed devices, to give an indication when any one of the devices is operated and to give individual indications of the operation of each of the devices.

A further object of the invention is to provide a supervisory control system which shall function in conjunction with an automatic reclosing system for a plurality of remotely disposed circuit breakers to indicate the position of each of the breakers, and to indicate and maintain an indication as long as desired of the operation of any automatic reclosing unit.

These and other objects and advantages of the invention will be apparent from the following detailed description taken in connection with the accompanying drawing the single figure of which is a diagrammatic representation of a supervisory control system embodying the principal features of my invention.

The invention is represented in the drawing as a modification of the supervisory control system disclosed and fully described in the Boswau Patent No. 2,208,535, issued July 16, 1940, certain relays and circuits of the Boswau system having been changed and modified, other parts having been omitted, and some circuit connections having been added. The parts of the Boswau system which are not affected in their functioning by the changes which were made to illustrate my invention are shown boxed at the control and remote stations and reference may be had to the Boswau patent for a complete description of this apparatus and its functioning. Other parts of the system which correspond to the parts of the Boswau system have the same reference numerals and additional parts are indicated by different reference characters.

Referring to the drawing it will be noted that the circuit breaker control and supervisory apparatus at the control station and the substation which is associated with point 1 of the supervisory control system are the same as shown and described in the Boswau patent and function to control and indicate the position of a circuit breaker at the substation. The supervisory control apparatus which is associated with point 4, however, has been modified to give an indication of the operation of an automatic reclosing means for the circuit breaker which is associated with point 1 and to retain this indication until it is desired to release it.

The supervisory apparatus associated with point 4 at the substation has been modified by eliminating the circuit breaker trip coil and closing coil shown in the Boswau patent, substituting a connection to negative battery through a current limiting resistor 500 and employing the operating circuit for the trip coil 319 of the Boswau patent as a shunting circuit to shunt down the relay 314 as desired.

An auxiliary contact element 321' may be disposed to be operated by the automatic reclosing system for the circuit breaker and may be a contact element operated when an automatic recloser for the circuit breaker, such as that shown in the hereinbefore referred to patent to Gamel, operates and may be operated simultaneously with the contact element 16 of the Gamel device. Thus the energizing circuit for the relay 314 extends from positive battery through the auxiliary contact element 321', a conductor 502, the winding of the relay 314, a conductor 504 and the resistor 500 to negative battery. The relay 314 closes its own holding circuit which extends from positive battery through a contact element 506 of the relay 314, conductors 508 and 502, the winding of the relay 314, the conductor 504 and the resistor 500 to negative battery. This holding circuit may be released when a trip impulse is received at the substation by the application of positive potential to the uppermost contact element of the relay 310, as explained in the Boswau patent, and thereby applying positive potential to the conductor 504 through a conductor 510.

The connections between the contact elements of the relay 314, which cooperate with the contact element 344, have been reversed from the position shown in the Boswau patent so that, when the automatic reclosing circuit breaker system operates momentarily, the actuation of the relay 314 will cause a 5 impulse close signal code to be sent to the control station after the number 4 point has been selected and a check back signal has been received at the substation.

At the control station the control switch 120 of the Boswau system has been eliminated, and the contact element associated with the contact element 198 of the relay 131 has been connected directly to the conductor 179. The disagreement lamp 118 of Boswau, which was associated with the control switch 120, has been eliminated.

Contact elements 512, 514, and 516 have been added to relays 134, 130 and 216, respectively, at the control station to provide an energizing circuit for the relay 215 which extends from positive potential through the contact element 512 of the relay 134, a conductor 518, the contact element 514 of the relay 130, a conductor 520, the contact element 516 of the relay 216, conductors 522 and 237, and the winding of the relay 215 to negative potential.

In the operation of the system, when the circuit breaker at the substation which is associated with point 1 is tripped for any reason, the supervisory control apparatus at the substation and the control station will function in response to the closure of the auxiliary switch 318 to energize the disagreement lamp 108 and the open indicating lamp 113 at the control station in the manner fully described in the Boswau patent hereinbefore referred to.

When the automatic reclosing system for the circuit breaker operates to reclose the breaker automatically, the auxiliary switch 321' which is actuated in response to the operation of the automatic recloser, as hereinbefore described, closes, the energizing circuit for the relay 314 is actuated and held energized over its holding circuit which extends from positive battery through the contact element 506 of the relay 314, conductors 508 and 502, the winding of the relay 314, conductor 504, and the current limiting resistor 500 to negative battery.

The actuation of the relay 314 will cause its contact armature 348 to move from back contact to front contact position to thereby momentarily open the holding circuit for the relay 313 to de-energize the relay 313 and cause its contact armature 350 to move to back contact position. When the contact armature 350 engages its cooperating back contact element the supervisory control apparatus at the substation and the control station will function, as described fully in the Boswau patent, hereinbefore referred to, to select point 4 at the control station and operate the point selecting relay 134.

The actuation of the point selecting relay 134 at the control station will cause the supervisory control apparatus to send a checking code of impulses to the substation to operate the point selecting relay 310 at the substation. When the point selecting relay 310 is operated the supervisory control system will function to send a code of 5 impulses under the control of the contact element 344 of the relay 314 in front contact position and these 5 impulses will actuate the signalling relay 130 at the control station as explained in the Boswau patent. The signalling relay 130 will operate to energize its own holding circuit and to energize the signal lamp 119 to indicate that the automatic recloser for the circuit breaker at the substation has operated.

The operation indication given by the signal lamp 119 at the control station will be retained as long as desired since the relay 314 at the substation is held energized over its own holding circuit regardless of the further operation of the reclosing system and the consequent movement of its auxiliary contact element 321'.

It is to be understood that the supervisory points 1 and 4 are only two of several points in the system and that a plurality of circuit breakers may be controlled and supervised by similar pairs of points in the manner described hereinbefore. Upon the opening and reclosure of any one of the breakers the supervisory control system hereinbefore described will give and retain an indication of which breaker has operated so that the operator may be informed of what operations have taken place at the substation. If a circuit breaker is tripped and reclosed and then tripped and locked out, the supervisory points will indicate the open position of the breaker and the fact that a reclosure and subsequent tripping has occurred. If the breaker stays closed when reclosed this information will be apparent from the supervisory control indications which will show the closed position of the breaker and the fact that an opening and a reclosure has occurred.

When the operator observes that a breaker has reclosed and is in the closed position he will want to restore the reclosure indicating apparatus to normal so that it may be available to indicate further automatic reclosures of the breaker. The supervisory control apparatus which provides the reclosure indication over point 4 of the supervisory control system may be reset by momentarily pressing the point operate switch 124. The closure of the lower contact element 125 of the point operate switch 124 causes the energization of the relay 216 which operates and closes its own holding circuit, and the closure of the upper contact element 126 shunts down the normally energized relay 131, as described in the Boswau patent.

When the relay 131 is released it causes a point selection code to be sent to the substation to operate the point relay 310 which is associated with the corresponding point number 4. The operation of the point relay 310 will cause a check code to be returned to the control station to operate the point relay 134. The operation of the point relay 134 will cause its contact armature 512 to complete the energizing circuit for the relay 215 extending through the contact armatures 512, 514, and 516 of the relays 134, 130 and 216 respectively. The operation of the relay 215 and the closure of the contact element 172 of the relay 134 and the contact element 198 of the relay 131 will cause a trip code of 3 impulses to be transmitted to the substation to close the shunting circuit for the relay 314 to thereby release the relay 314.

The release of the relay 314 will cause a 4 impulse control code to be sent to the control station to operate the point relay 134, and, in turn, a check code will be sent back to the substation to operate the point relay 310. When the point relay 310 is operated a trip code of 3 impulses will be sent to the control station under the control of the relay 314 in released position and the signalling relay 130 will be shunted down to open the energizing circuit for the signal lamp 119. The supervisory control system will then be returned to normal condition ready for further circuit breaker operations and supervisory control indications of circuit breaker positions and circuit breaker reclosures.

Thus it will be seen that I have provided a supervisory control system which shall function in conjunction with an automatic reclosing system for a plurality of remotely disposed circuit breakers to indicate the position of each of the breakers and to indicate and maintain an indication as long as desired of the operation of any automatic reclosing unit.

In compliance with the requirements of the patent statutes I have shown and described herein a preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In a combined signalling and remote control system, a plurality of control points at a control station and a plurality of corresponding control points at a remote station, a supervisory control system interconnecting the control and remote stations, a plurality of circuit breakers and automatic reclosing means therefor at the remote station, position indicating means at the control station for each of a plurality of said circuit breakers, means including said supervisory control system and certain of said control points at the control and remote stations controlled by the open and closed positions of said circuit breakers for causing said position indicating means to indicate the positions of said circuit breakers, signalling means associated with other of the control points, each of said signalling means comprising a code control relay at the remote station, a signal relay, a signal device responsive to the signal relay, and a release device at the control station, means responsive to the momentary operation of a different one of said automatic reclosing means at the remote station for energizing said code control relay, circuit means controlled by said code control relay for closing a holding circuit for said code control relay, means including said supervisory control system responsive to the actuation of said code control relay for actuating the signal relay of the associated point at the control station, means including said supervisory control system responsive to the actuation of the release device for releasing the associated code control relay at the remote station, and means including the supervisory control system responsive to the release of the code control relay for releasing the associated signal relay at the control station.

2. In a signalling system, a pair of control points at a control station, a pair of control points at a remote station, a supervisory control system interconnecting the control and remote stations, a circuit breaker having automatic reclosing means at the remote station, means controlled by the circuit breaker and including one of the control points at each of the stations and the supervisory control system for indicating at the control station the position of the circuit breaker, and means controlled by the operation of the circuit breaker reclosing means and including the other control points at the control and remote stations and the supervisory control system for giving an indication and retaining the indication at the control station of the operation of the circuit breaker reclosing means separate from the breaker position indication.

3. In a signalling system, a plurality of control points at a control station, a plurality of control points at a remote station, a selective supervisory control system interconnecting the control and remote stations, a plurality of circuit breakers having automatic reclosing means associated therewith at the remote station, means controlled by the circuit breakers and including certain of the control points each associated with a separate circuit breaker at each of the stations and the supervisory control system for signalling at the control station the position of the individual circuit breakers, and means controlled by the operation of the individual circuit breaker reclosing means and including other control points at each of the stations individual to the separate circuit breaker reclosing means and the supervisory control system for giving at the control station an individual indication and retaining the indication of the operation of any of the circuit breaker reclosing means separate from the breaker position indication.

4. In a signalling system, a plurality of control points at a control station, a plurality of control points at a remote station, a selective supervisory control system interconnecting the control and remote stations, a plurality of circuit breakers having automatic reclosing means associated therewith at the remote station, means controlled by the circuit breakers and including certain of the control points each associated with a separate circuit breaker at each of the stations and the supervisory control system for controlling and signalling the position at the control station of the individual circuit breakers, means controlled by the operation of the individual circuit breaker reclosing means and including other control points at each of the stations individual to the separate circuit breaker reclosing means and the supervisory control system for giving at the control station an individual indication and retaining the indication of the operation of any of the circuit breaker reclosing means, separate from the breaker position indication and means associated with the individual reclosure indication points at the control station for resetting the individual indicating systems for subsequent operation.

WILLARD A. DERR.